(12) United States Patent
Stephens

(10) Patent No.: US 12,401,179 B1
(45) Date of Patent: Aug. 26, 2025

(54) ELECTRICAL BOX SPACER

(71) Applicant: S&C Manufacturing LLC, Bernie, MO (US)

(72) Inventor: Randell Scott Stephens, Bernie, MO (US)

(73) Assignee: S&C Manufacturing LLC, Bernie, MO (US)

( * ) Notice: Subject to any disclaimer, the term of this patent is extended or adjusted under 35 U.S.C. 154(b) by 2 days.

(21) Appl. No.: 18/584,721

(22) Filed: Feb. 22, 2024

Related U.S. Application Data

(60) Provisional application No. 63/448,178, filed on Feb. 24, 2023.

(51) Int. Cl.
*H02G 3/12* (2006.01)

(52) U.S. Cl.
CPC ..................................... *H02G 3/12* (2013.01)

(58) Field of Classification Search
CPC ............ H02G 3/12; H02G 3/08; H02G 3/086; H02G 3/121
USPC ....... 220/694, 3.3, 3.9, 4.02; 174/54, 55, 56, 174/481; 439/527, 535
See application file for complete search history.

(56) References Cited

U.S. PATENT DOCUMENTS

| | | | | |
|---|---|---|---|---|
| 1,038,963 | A * | 9/1912 | Roe | H02G 3/185 |
| | | | | 220/3.7 |
| 2,378,861 | A * | 6/1945 | Peevey | H02G 3/121 |
| | | | | 220/8 |
| 4,561,615 | A | 12/1985 | Medlin, Jr. | |
| 4,874,334 | A | 10/1989 | Golden | |
| 4,909,692 | A | 3/1990 | Hendren | |
| 4,927,039 | A * | 5/1990 | McNab | H02G 3/125 |
| | | | | 220/3.7 |
| 4,948,317 | A | 8/1990 | Marinaro | |
| 5,117,996 | A | 6/1992 | McShane | |
| 5,402,902 | A * | 4/1995 | Bouley | H02G 3/121 |
| | | | | 220/3.7 |
| 5,921,737 | A | 7/1999 | Ibey | |
| 7,002,076 | B2 * | 2/2006 | Ungerman | H02G 3/086 |
| | | | | 174/53 |

(Continued)

OTHER PUBLICATIONS

Gardner Bender Spacers [online]. Amazon, Feb. 22, 2024. Retrieved from the Internet: <URL: https://www.amazon.com/Gardner-Bender-GSP-24-Receptacle-Spacers/dp/B00ATOYNA0>.

(Continued)

*Primary Examiner* — Rafael A Ortiz
(74) *Attorney, Agent, or Firm* — Carmody MacDonald P.C.; Kevin C. Staed; Dennis J M Donahue, III

(57) ABSTRACT

The electrical box spacer is an improved spacer for mounting an outlet or switch within an electrical box at the proper depth relative to the corresponding wall in which the electrical box is placed. The spacer includes a bore for receiving the mounting screw used to fasten the outlet or switch to the electrical box and a fastener on the proximal edge that releasably fastens to the perimeter edge of the electrical box. In operation, the perimeter edge of the electrical box snaps into a groove along the proximal edge of the spacer body and the bore aligns with the threaded anchor portion of the electrical box which threadingly receives the mounting screw. When an extended spacer is needed, multiple bodies can be stacked together with depressions within one body connecting to the snap fastener of an adjacent body.

20 Claims, 9 Drawing Sheets

(56) References Cited

U.S. PATENT DOCUMENTS

| | | | | |
|---|---|---|---|---|
| 7,342,173 | B1* | 3/2008 | Kidman | H02G 3/083 |
| | | | | 174/53 |
| 7,637,385 | B2* | 12/2009 | Wegner | H02G 3/121 |
| | | | | 220/3.7 |
| 8,245,453 | B2 | 8/2012 | Struthers et al. | |
| 8,690,601 | B2* | 4/2014 | Perritt | H02G 3/126 |
| | | | | 439/535 |
| 8,759,676 | B1* | 6/2014 | Gretz | H02G 3/185 |
| | | | | 439/535 |
| 8,933,331 | B1* | 1/2015 | Gretz | E04B 2/00 |
| | | | | 174/53 |
| 9,035,177 | B1* | 5/2015 | Gretz | H02G 3/121 |
| | | | | 439/538 |
| 10,490,961 | B2* | 11/2019 | Smith | H01R 13/74 |
| 10,581,232 | B2* | 3/2020 | Peterson | H02G 3/081 |
| 11,557,888 | B2* | 1/2023 | Phillips | H01R 13/746 |
| 2004/0045960 | A1* | 3/2004 | Rose | H02G 3/086 |
| | | | | 220/3.9 |
| 2008/0196921 | A1* | 8/2008 | Dinh | H02G 3/121 |
| | | | | 220/3.6 |
| 2016/0079742 | A1* | 3/2016 | Petak | H02G 3/12 |
| | | | | 248/231.9 |
| 2016/0172832 | A1* | 6/2016 | Geno | H02G 3/086 |
| | | | | 174/502 |
| 2019/0222010 | A1* | 7/2019 | Peterson | H02G 3/081 |
| 2021/0091552 | A1* | 3/2021 | Reynolds | H02G 3/18 |
| 2022/0329056 | A1 | 10/2022 | Gow et al. | |
| 2023/0104610 | A1* | 4/2023 | Hanley | H02G 3/12 |
| | | | | 29/825 |

OTHER PUBLICATIONS

Goldblatt Spacers [online]. Floor & Decor, Feb. 22, 2024. Retrieved from the Internet: <<URL: https://www.flooranddecor.com/installation-tools-tile-stone-installation-materials/goldblatt-outlet-spacers---50-pack-100594258.html?gclid=Cj0KCQiA54KfBhCKARIsAJzSrdqyqBshAENGN2sLkAwTDHGGmOx6nWtM3-liTPlwn_l2cpf2ATh1xGsaAsP0EALw_wcB&gclsrc=aw.ds>.

Extender Buddy [online]. Amazon, Feb. 22, 2024. Retrieved from the Internet: <URL: https://www.amazon.com/Outlet-Extender-Buddy-Electrical-Recessed/dp/B08Q3C37HC/ref=asc_df_B08Q3C37HC/?tag=hyprod-20&linkCode=df0&hvadid=475752358038&hvpos=&hvnetw=g&hvrand=10343770279687730368&hvpone=&hvptwo=&hvqmt=&hvdev=c&hvdvcmdl=&hvlocint=&hvlocphy=9022896&hvtargid=pla-1120990239735&psc=1&region_id=674469>.

Spacer Box [online]. Amazon, Feb. 22, 2024. Retrieved from the Internet: <URL: https://www.amazon.com/dp/B079ZC8GQK/ref=sspa_dk_detail_2?psc=1&pd_rd_i=B079ZC8GQK&pd_rd_w=1xbqM&content-id=amzn1.sym.dd2c6db7-6626-466d-bf04-9570e69a7df0&pf_rd_p=dd2c6db7-6626-466d-bf04-9570e69a7df0&pf_rd_r=ERHS0Q5QEKRV2MPZECX6&pd_rd_wg=CxMPD&pd_rd_r=15cb16e9-ecb7-48da-a43f-bf2ae5b59a57&s=hi&sp_csd=d2lkZ2V0TmFtZT1zcF9kZXRhaWxfdGhlbWF0aWNfaGlma&spLa=ZW5jcnlwdGVkUXVhbGlma.

\* cited by examiner

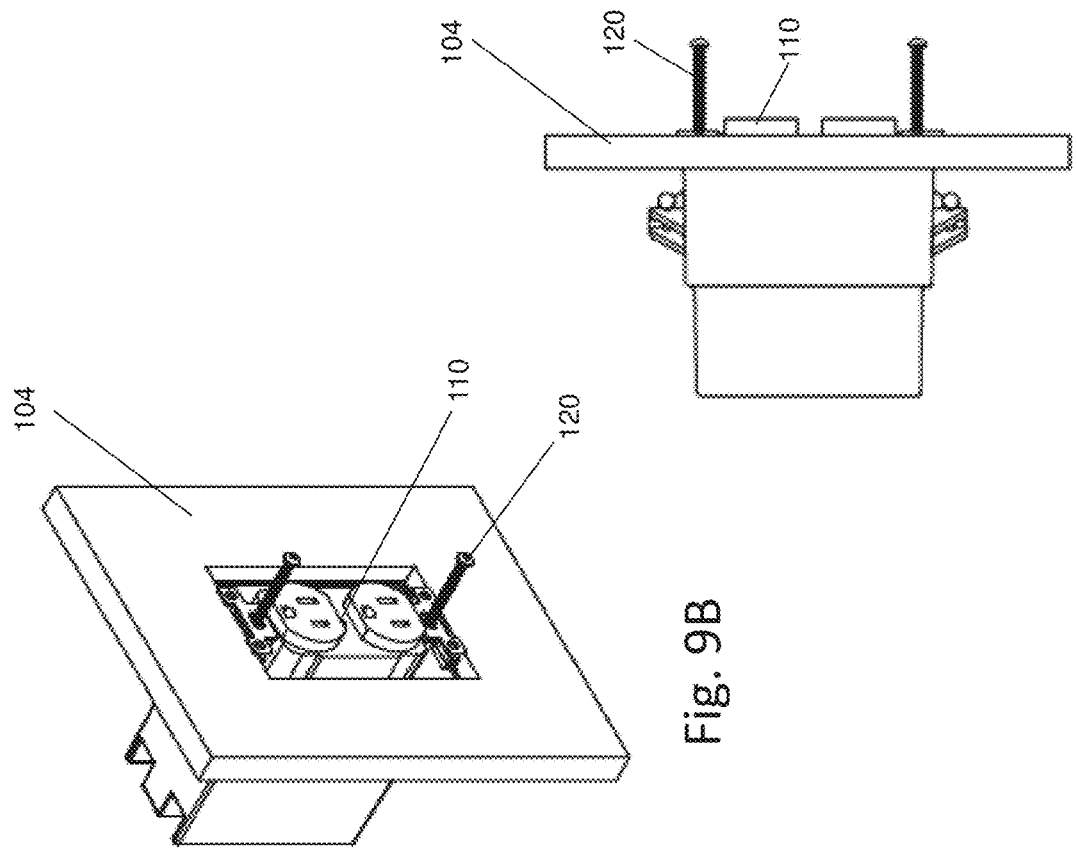
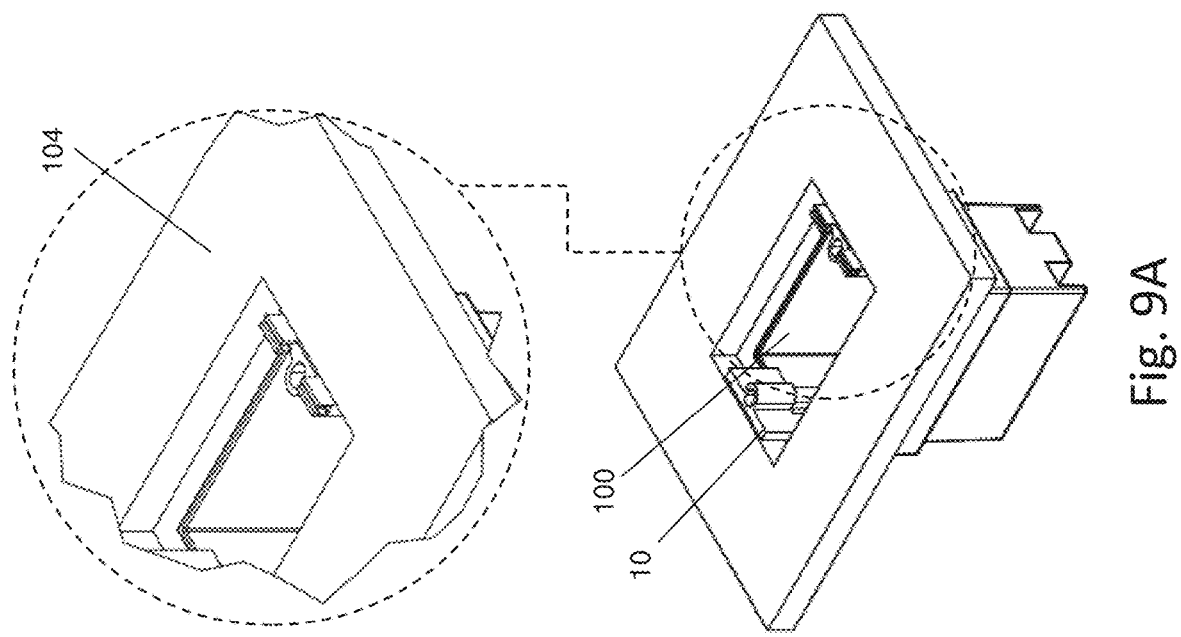

ELECTRICAL BOX SPACER

CROSS-REFERENCE TO RELATED APPLICATIONS

This application claims priority from U.S. Provisional Patent Application No. 63/448,178 filed on Feb. 24, 2023 which is incorporated by reference herein.

STATEMENT REGARDING FEDERALLY SPONSORED RESEARCH

Not Applicable.

APPENDIX

Not Applicable.

BACKGROUND OF THE INVENTION

Field of the Invention

The present invention relates to spacers, and more particularly to a spacer for an electrical box.

Related Art

Spacers have long been used in various industries to maintain a space between structures. One such use is particularly directed to electrical boxes and corresponding switches or outlets mounted therein. Generally, electrical wiring is routed through the walls of buildings and attach to switches or outlets, and other fixtures, through recessed boxes mounted to wall studs at various points within a given wall. The electrical connections, wiring and internal components of the switch or outlet are held within the electrical box and hidden from view by a removable cover that attaches on the face of the wall. When fully installed, only the exterior face of the switch or outlet is visible.

A problem arises when the electrical box is recessed too far into the wall and the exterior face of the switch or outlet is recessed into the wall rather than flush therewith. When existing homes or buildings are remodeled, or, otherwise modified from their original wall and ceiling surfaces, it is common for new tile, paneling, drywall or other covering to be placed over the existing walls or ceilings. This results in the existing electrical boxes not being flush with the new covering and the screw mounts for the switches and outlets being recessed within the wall. This misalignment requires the time-consuming process of placement of washers, tubular spacers, or, other shims being obtained, measured, aligned and placed between the electrical box and the switch or outlet to obtain the proper alignment. Similarly, in new home and building construction the electrician places all of the electrical switch and outlet electrical boxes on the framing prior to installation of the drywall or other surface materials being placed on the framing for the walls. If the electrical box is flush with the wall surface, then installation of the switch or outlet and cover plate can be done relatively quickly. However, if the electrical boxes are misaligned and not flush with the wall, either because of a twisted, bowed or bent framing material or because of installation error, then the switch or outlet if securely attached to the box will result in an angled or cocked relationship with the wall and an exaggerated misalignment once the face plate is installed. If not securely attached to the box the result will be a loose or floating switch or outlet not being properly supported.

Although a recessed switch or outlet may operate properly, the recess may prevent the cover plate from properly mounting and more generally create an aesthetically displeasing look. Accordingly, persons in the art use spacers to offset the switch or outlet from the recessed box and properly position the exterior face of the switch or outlet flush with the face of the wall in which they are mounted. Yet, there remains a desire to those in the art to provide an improved spacer that can be more quickly and reliably used during the installation process without any additional fasteners or preparation.

One of the most common spacer types used by persons in the art are stacked spacers that consist of interlock layers that are stacked together until a desired length is reach. For example, U.S. Pat. No. 4,909,692 by Hendren and the GARDNER BENDER® receptacle spacers shown in FIG. 1A are flexible spacers that snap together to form a stacked spacer with a collective length that spans the recessed depth for a particular electrical box. During the installation process, the electrician can get a rough estimate of the recessed depth of the box and snap any number of the spacers together until the layer of spacers have a collective length that spans the recessed depth. Subsequently, the electrician can hold the stack of spacers together and insert the mounting screw through the switch or outlet, into an opening within the stacked spacers and subsequently into the threaded bore in the electrical box to hold the switch or outlet in place. With the opening of the stacked spacers surrounding the screw, the recess between the box and the switch or outlet is spaced by the stack of spacers so that the exterior face is as flush with the wall as possible.

Although effective at spacing the box from the switch or outlet when installed correctly, these stacked spacers can only be installed after the electrician has measured the recessed depth and subsequently separated and stacked individual layers of spacers together until the desired length is reached. Alternatively, the electrician must guess the recessed depth and use a trial-and-error method of adding or removing spacers from the stack until they are satisfied with the relative position of the exterior face of the switch or outlet to the wall. Another problem arises during installation because not only are the stacked spacers free-floating between the box and the outlet or switch and may tend to spin or fall all the way off the screw until it is fully tightened, but they also only longitudinally space the box from the switch or outlet and do not provide any lateral support when assembled. Furthermore, the stacked spacers can compress as the mounting screw is tightened and they are more tightly wedged between box and outlet or switch such that the exterior face may move out of alignment with the wall, requiring the process to be repeated. Considering measuring the recessed depth requires another tool, this trial-and-error method does not repeatably or reliably position the exterior of the face of the outlet or switch flush with the wall. Thus, considering the shortcomings of the flimsy stacked spacers commonly used, persons in the art are in need of an improved spacer that is not only easier to use but also more reliable.

Other spacers in the prior art include tubular washers that fit around the switch or outlet mounting screw and wedge between the box and switch or outlet as the mounting screw is tightened, such as with the OUTLET EXTENDED BUDDY™ shown in FIG. 1B. Although effective at spacing the box from the switch or outlet, the tubular washers must be cut to the proper size after the recessed depth is measured, necessitating an additional step during the installation process. Furthermore, the tubular washer has an extended longitudinal length to longitudinally space the box from the switch or outlet but does not have an extended lateral dimension and therefore fails to provide any lateral stability to the structure when assembled.

Other larger spacers having a tubular washer and a skeletal body that mirror the size of the box and switch or outlet can also be secured with the mounting screw to space the box from the switch or outlet, such as with SMART FIL SPACERS™ shown in FIG. 1C. Although these larger spacers provide lateral support to the assembled structure, they can only be effectively used with a box and switch or outlet that has a matching size and cannot be readily used with any size box, switch or outlet.

Considering the problems with spacers in the prior art, there remains a need for a spacer that offers a simple, fast, inexpensive way to align and secure the mounting of switches and outlets to electrical boxes that are misaligned with the surface walls in which they are mounted. This improved spacer should eliminate the requirement of multiple pieces to hold by hand and manipulate and align with the threaded anchors in the box for installation. Further, this improved spacer should not require the installer to measure, cut and align a floating spacer between the outlet or switch and the box. Finally, this spacer should also provide additional stability to the assembled unit even though the switch or outlet is offset from the box.

SUMMARY OF THE INVENTION

The spacer described herein is an improved mechanical device for mounting an outlet or switch within an electrical box at the proper depth relative to the corresponding wall in which the electrical box is placed. The spacer includes a body with a bore for receiving the mounting screw fastener used to fasten the outlet or switch to the electrical box and a tab with a groove on the proximal edge that releasably fastens to the perimeter edge of the electrical box. In the preferred embodiment, the perimeter edge of the electrical box snaps into a groove and the bore aligns with the threaded anchor portion of the electrical box to allow the fastener screw to extend through the spacer connect the fixture to the box on opposite ends of the spacer. Unlike spacers in the prior art, the spacer described herein is secured to the box itself with a quick snap-fit such that the user does not need to hold the spacer in place while they screw the mounting screw into the anchor or attach the spacer to the box or wall with a separate fastener.

In another aspect of the spacer, the lateral width of the spacer body is greater than the body thickness such that the spacer not only maintains the longitudinal distance between the electrical box and outlet or switch but also prevents lateral rotation of the outlet or switch. Accordingly, the spacer provides rigidity to the entire unit such that the outlet is securely attached to the electrical box even when it is spaced therefrom without requiring a unique box or additional fastener. Thus, the space firmly attaches to the electrical box aligning with the threaded anchor in the box. The device comes in various sizes that are color coded, self-measuring, and, add rigidity and stability to the switch or outlet once installed.

In another aspect of the preferred embodiment of the spacer described herein, an extended spacer can be created by stacking multiple bodies together in a stacked arrangement. Depressions are provided along the distal edge of each body to allow the depression of one body to be snapped into the groove of an adjacent body until the desired length is reached.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 9A-9C illustrate a spacer, an electrical box and electrical fixture within a wall according to an embodiment described herein.

DETAILED DESCRIPTION OF THE PREFERRED EMBODIMENTS

Figure 1B:
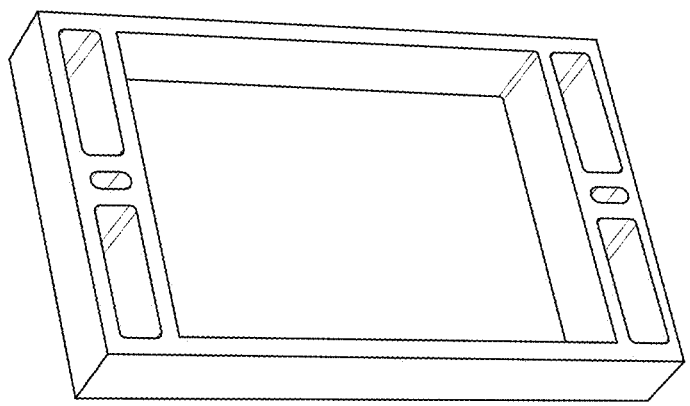
FIGS. 1A-1C show spacers in the prior art.
Figure 1C:
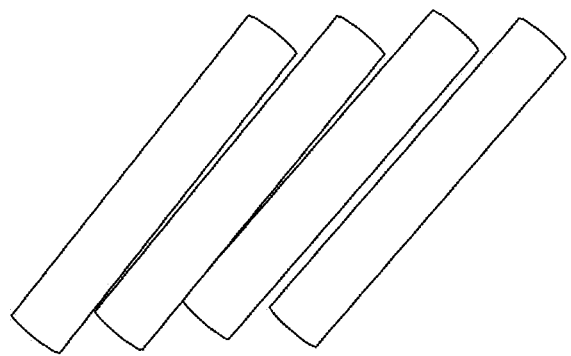
Figure 1A:
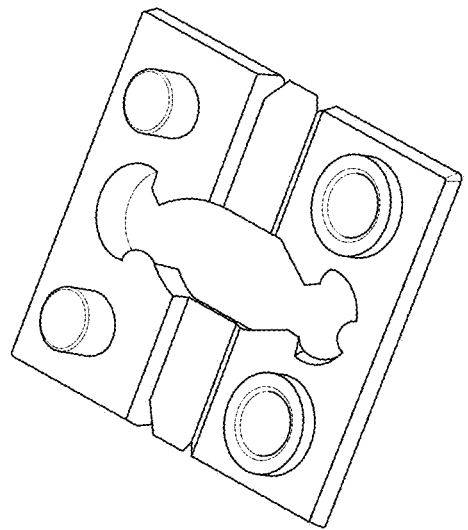
Figure 2B:
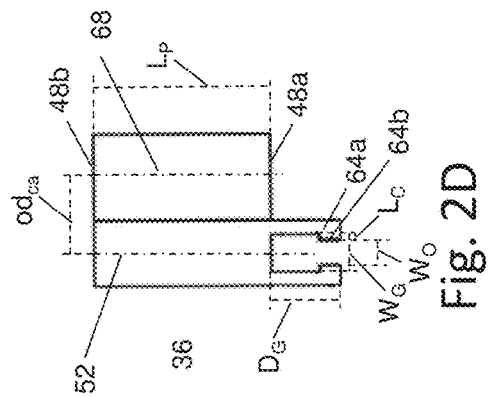
FIGS. 2A-2D respectively show a perspective view, a surface view, a distal edge view and a side view of a spacer according to an embodiment of the invention described herein.
Figure 2D:
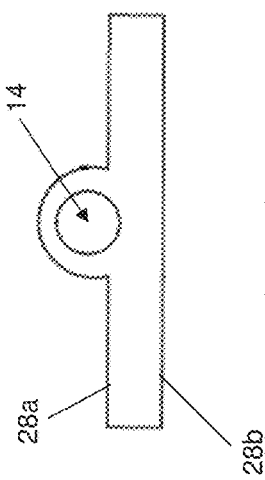
Figure 2A:
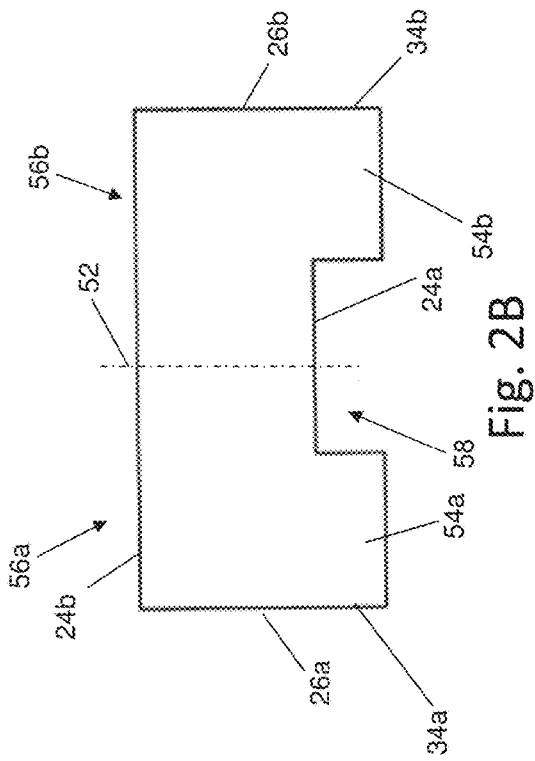
Figure 2C:
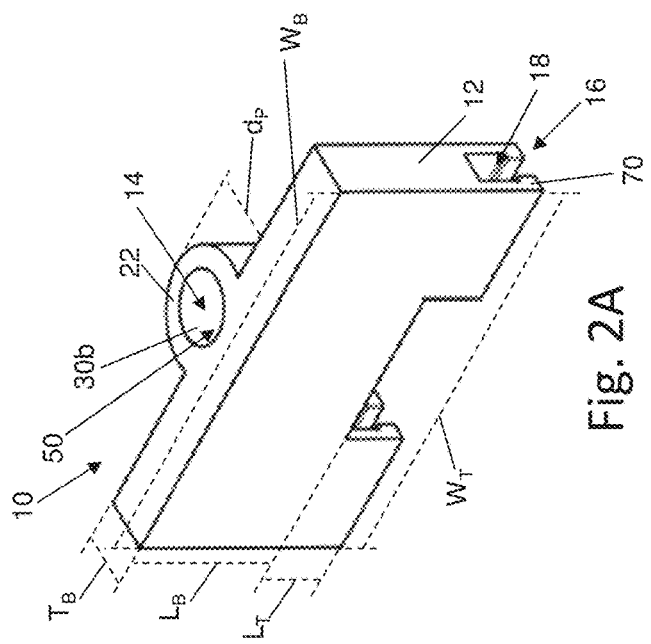
Figure 3B:
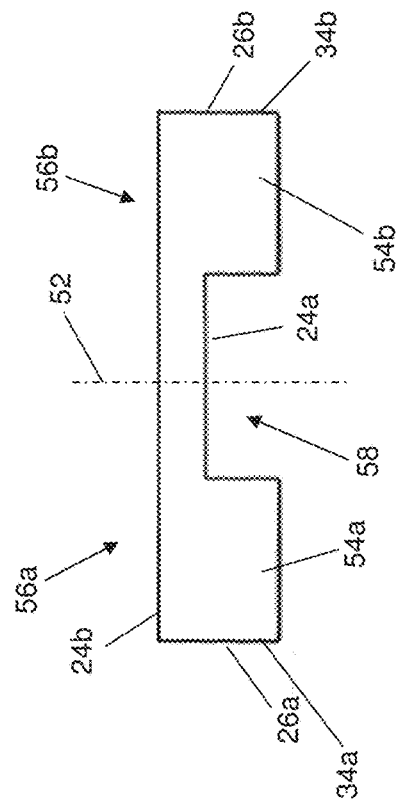
FIGS. 3A-3D respectively show a perspective view, a surface view, a distal edge view and a side view of a spacer according to another embodiment of the invention described herein.
Figure 3D:
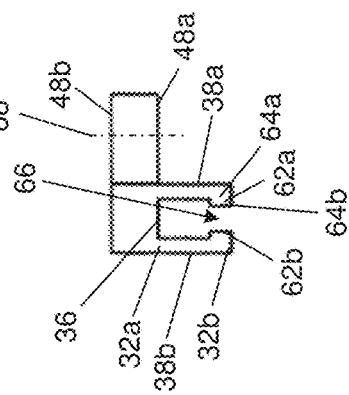
Figure 3A:
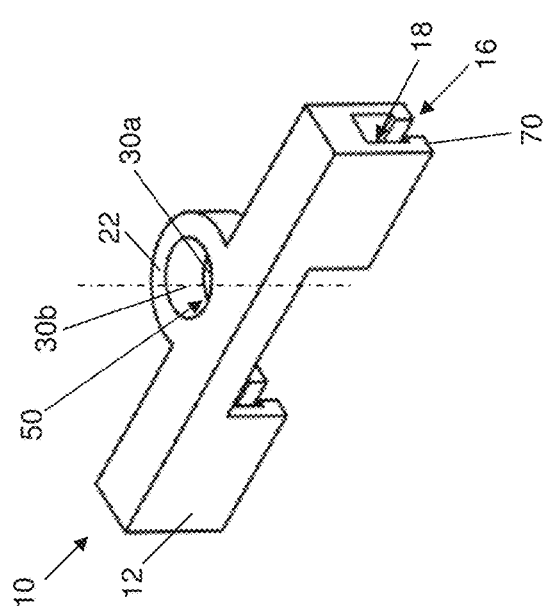
Figure 3C:
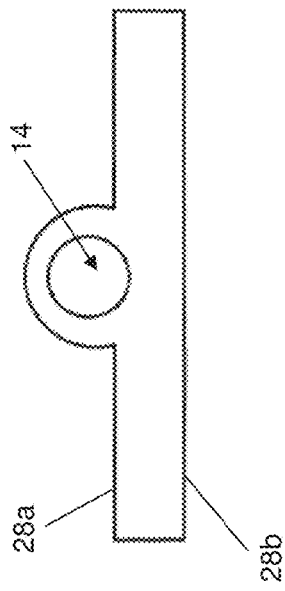
Figure 4B:
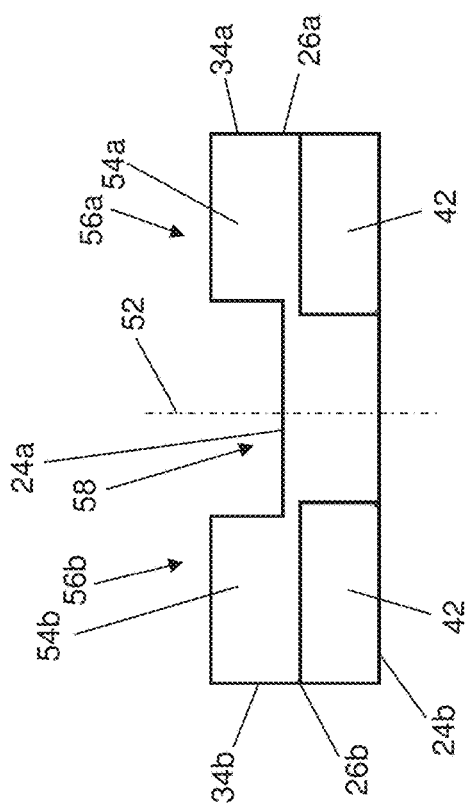
FIGS. 4A-4D respectively show a perspective view, a surface view, a distal edge view and a side view of a spacer according to another embodiment of the invention described herein.
Figure 4D:
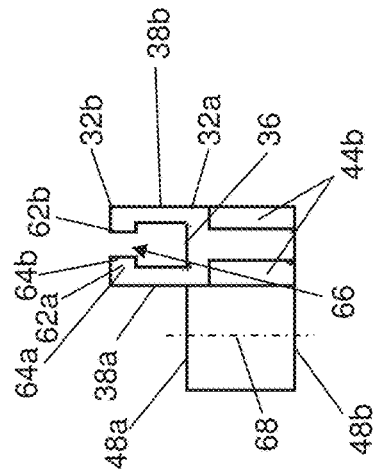
Figure 4A:
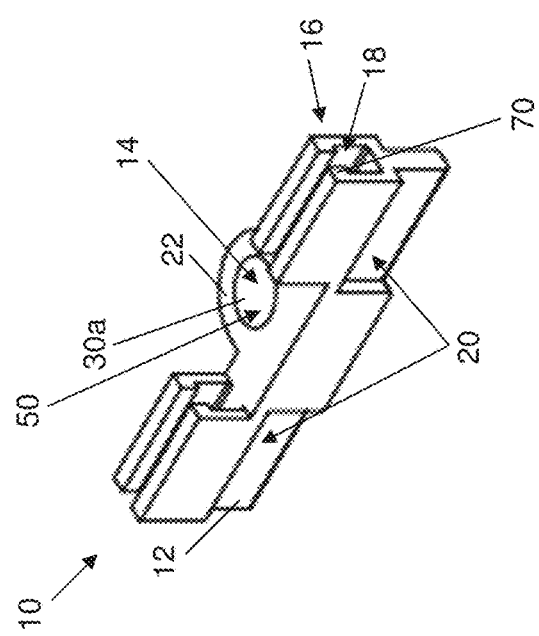
Figure 4C:
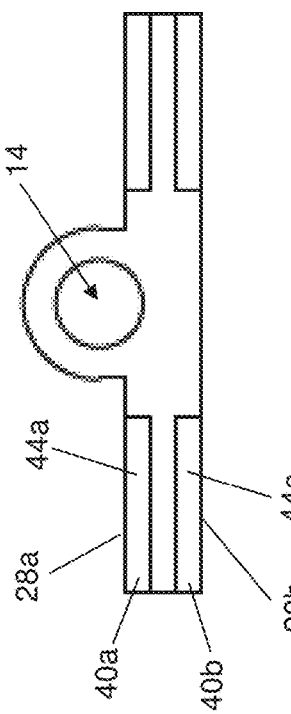
Figure 5B:
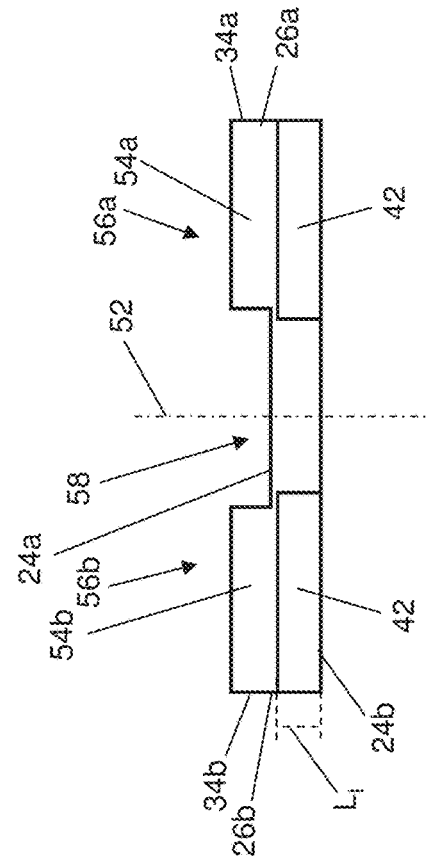
FIGS. 5A-5D respectively show a perspective view, a surface view, a distal edge view and a side view of a spacer according to another embodiment of the invention described herein.
Figure 5A:
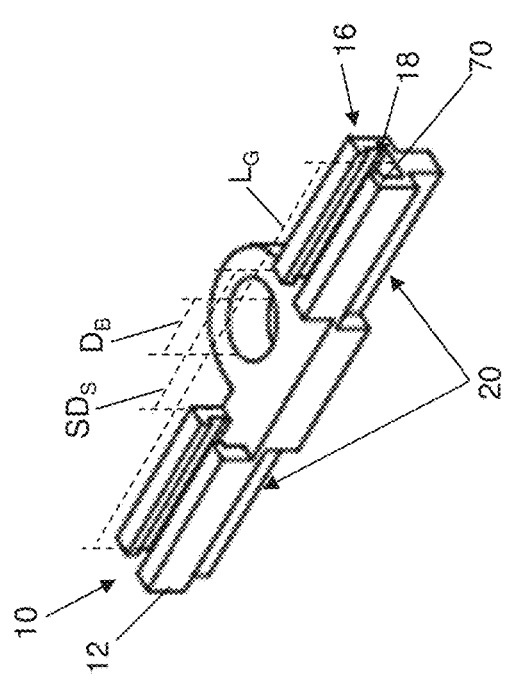
Figure 5D:
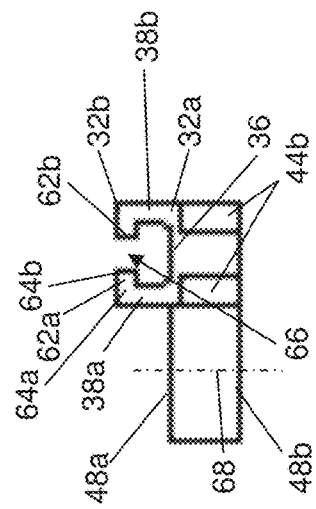
Figure 5C:
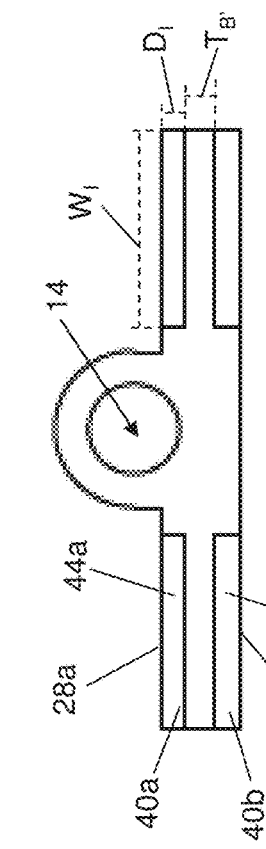

The following description of the preferred embodiment(s) is merely exemplary in nature and is in no way intended to limit the invention, its application, or uses.

The spacer described herein is intended for use with electrical boxes to maintain the distance between the perimeter of the electrical box and the back side of the outlet's mounting bracket, switch or other fixture mounted therein. There has long been a need for an improved spacer for use with electrical components mounted within electrical boxes because it is common for electrical boxes to be too far recessed into the wall in which they are mounted such that the outlet, switch or other fixture must be offset from the front plane of the electrical box to be flush with the wall. If no offset is provided with a spacer, the switch, outlet or other fixture is also recessed into the wall or is not securely mounted into the electrical box which can lead to an aesthetically displeasing look from misalignment. The spacer according to the present invention is described with reference to an electrical box having an outlet but it will be appreciated by those in the art that the spacer could be used within any type of fixture commonly mounted to an electrical box including but not limited to an outlet, a switch and a light.

Generally, electrical boxes 100 are affixed to the wall studs at various locations within a wall 104 and an outlet 110 is mounted to the boxes with internal wiring being held in the electrical box while the switch, plug or other feature is exposed on the exterior of the wall proximate to the electrical box. To mount the outlet to the electrical box, mounting screws 120 thread through a mounting aperture 122 in the fixture and attach to a threaded anchor 124 within the box itself. These threaded anchors are commonly positioned on the interior of the box along the top and bottom of the perimeter edge 102. To offset the fixture from the perimeter edge of the electrical box, the spacer described herein and shown in the preferred embodiments in FIGS. 2A, 3B, 4B and 5B are positioned between the perimeter edge of the box and the back face of the outlet as shown in the drawings and further described below.

Figure 8C:
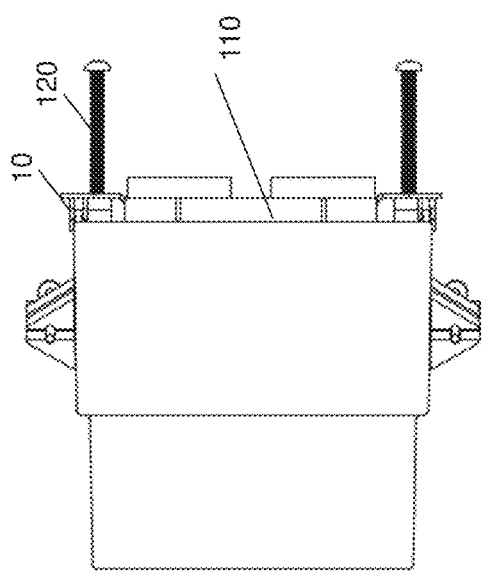
FIGS. 8A-8C illustrate the connection of a spacer set to an electrical box and electrical fixture according to an embodiment described herein.
Figure 8B:
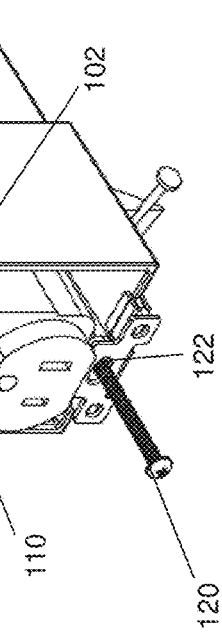
Figure 8A:
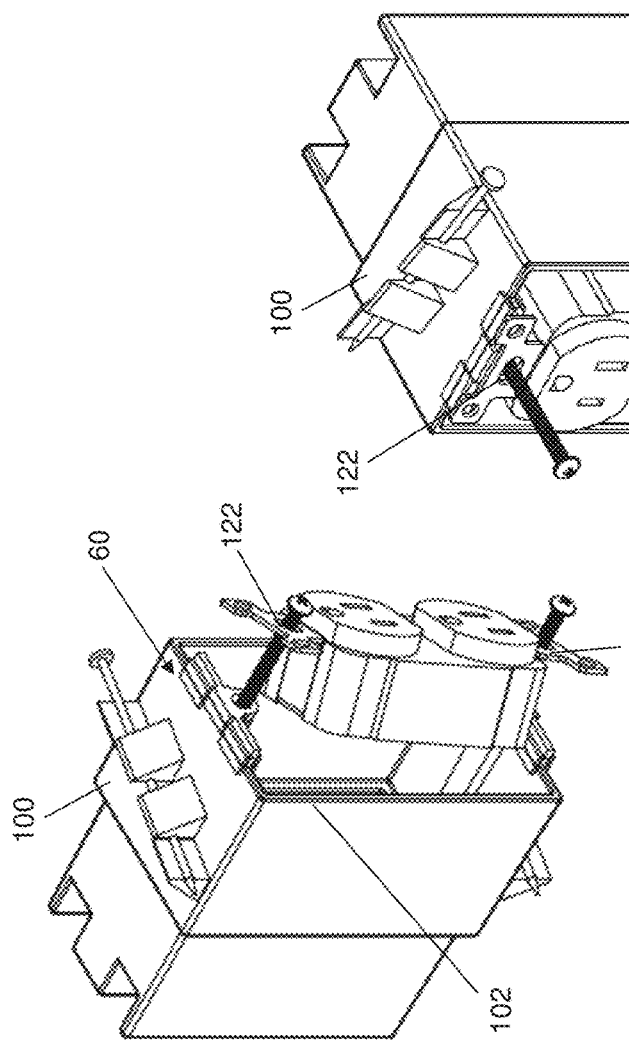

As shown in FIGS. 2B, 3B, 4B and 5B, spacer 10 embodiments include a body 12 with a proximal edge 24a and a distal edge 24b spaced a longitudinal length ($L_B$) by a pair of opposing side edges 26a and 26b. When fastened to the perimeter of the electrical box, the distal edge, and the subsequent outlet connected thereto, is offset from the perimeter of the box by the longitudinal length of the body as illustrated in FIGS. 8A-8C. The body also has a lateral dimension with the pair of opposing side edges spaced by a lateral width ($W_B$) as particularly shown in FIGS. 2C, 3C, 4C and 5C. In some embodiments the longitudinal length is greater than the lateral width while other embodiments may have a lateral width that is greater than the longitudinal length. The body also has a thickness ($T_B$) between opposing surfaces that is preferably no less than the thickness of the box perimeter ($T_P$). However, as described with regard to the tabs protruding from the body below, the thickness of the body could be less than the perimeter of the box with the tabs being angled outwards to receive box and attached the body thereto.

The preferred bodies have a substantially rectangular shape but it will be appreciated by those having an ordinary skill in the art that the body may be any number of shapes, such as circular or triangular, without departing from the inventive aspects described herein. Furthermore, although the preferred spacer has a substantially planar body, alternative embodiments could include a radius of curvature or an irregular edge to allow the spacer to be used with boxes of different shapes. For example, a spacer having a proximal and distal edge with a radius of curvature may be used with a circular electrical box.

Figure 6C:
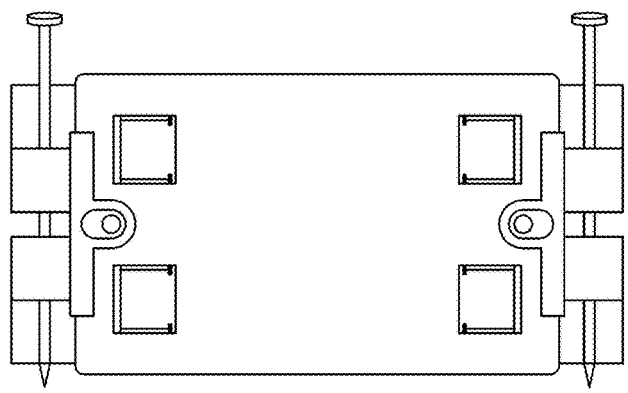
FIGS. 6A-6C illustrate the connection of a spacer to an electrical box according to an embodiment described herein.

As best shown in FIGS. 2C, 3C, 4C and 5C, a bore 14 is provided within the body and extends between a proximal opening 30a that is coplanar with the proximal edge of the body and a distal opening 30b that is coplanar with the distal edge. When the spacer is properly situated between a box and outlet as shown in FIG. 6C, the proximal opening of the bore aligns with the threaded anchor of the box and the distal opening aligns with the mounting aperture of the outlet such that the mounting screw extends through the bore, securing the outlet to the box with the spacer sandwiched between as illustrated in FIG. 8C.

Preferably, the bore is situated within a tubular protuberance 22 protruding a distance ($d_P$) from one of the surfaces 28a and 28b of the body. The protuberance longitudinally extends a length ($L_P$) between opposing ends 48a and 48b that are coplanar with the opposing proximal and distal edges of the body with at least a portion 50 of the bore extending therethrough. In this preferred embodiment, the bore is at least partially offset from the surface of the body within the protuberance to allow the proximal edge of the body to abut the perimeter of the box while the bore aligns with the threaded anchor within the interior of the box. When a spacer is used on the top of a box, the protuberance is oriented downward and thereby protrudes from the bottom surface of the body. However, when the spacer is used on the bottom of the box, the protuberance is oriented upward and thereby protrudes from the bottom surface of the box. Thus, the particular orientation of the body surfaces is not intended to be limiting.

The thickness of the body preferably matches the thickness of the perimeter of the box such that the proximal edge abuts the perimeter of the box in the fastened orientation and the protuberance protrudes from the body surface to align with the interiorly spaced threaded anchor in the electrical box. To provide lateral support to the outlet when fully assembled, the lateral width is at least as great as the thickness. In the preferred embodiment a centerline 52 equidistant from the opposing edges bisects the body and the bore has a central axis 68 offset a distance ($od_{ca}$) from the centerline, removed from the surface of the body. The spacer is thereby centered relative to the threaded anchor within the box such that lateral sway is limited by the width of the body which has a wider cross-section than the protuberance and bore through which the mounting screw extends. Accordingly, force on the side of the spacer or outlet attached thereto will not cause the outlet to laterally pivot because the widened proximal edge abuts the perimeter edge of the box. Although it is preferred that the bore and corresponding mounting screw are therefore centered on the spacer to prevent lateral pivot from forces applied on either side, it will be appreciated that the aperture could be offset from the center of the body without departing from the inventive features described herein.

As best shown in FIGS. 2D, 3D, 4D and 5D, the spacer includes an integrated fastener on the proximal edge of the body that releasably fastens to the perimeter of the box in a fastened orientation and releases from the box in an unfastened orientation. Accordingly, the user can fasten the proximal edge of the spacer to the box and subsequently connect the outlet by inserting the mounting screw through mounting aperture, body bore and into the threaded anchor without having to otherwise support or secure the spacer. Once assembled, the spacer remains not only fastened to the box via the fastener but also wedged between the back side of the outlet's mounting bracket, offset by the longitudinal length of the body, and the perimeter of the box.

The fastener is preferably a tab 16 with a groove 18 that snaps onto the perimeter of the box. The tab protrudes a tab length ($L_T$) from a fixed end 32a connected to the proximal edge of the body to a free end 32b spaced from the free end. The tab has a lateral width ($W_T$) between opposing side ends 34a and 34b and the groove extends a groove length ($L_G$) through the tab between the opposing side ends. The groove includes sidewalls 38a and 38b spaced apart by a groove width ($W_G$) and a trough 36 that is recessed from the free end of the tab by a groove depth ($D_G$).

Figure 6B:
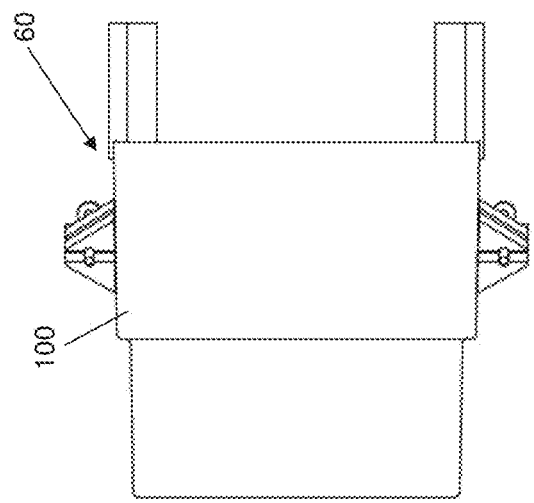
Figure 6A:
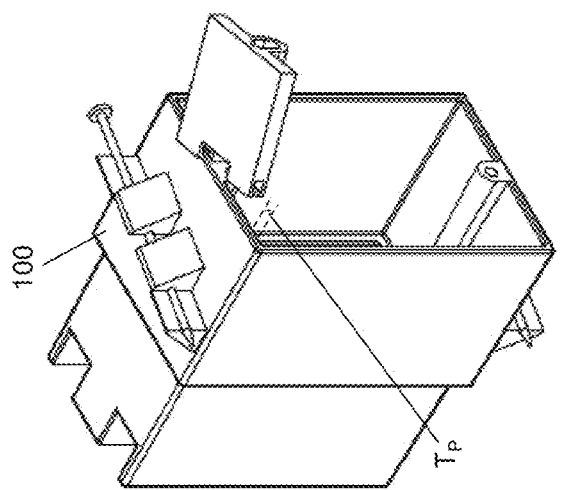

In operation, the perimeter of the box is received in the groove between the sidewalls as shown in FIGS. 6A and 6B. Once the edge of the box is fully inserted into the groove with the trough of the groove abutting the perimeter of the box. As shown in FIG. 6B, the sidewalls bias outwardly to receive the perimeter of the electrical box from their vertical position such that the sidewalls of the groove hold the body in the fastened position with a friction-fit 60. To release the groove from the box, the user need only pull on the spacer with a force sufficient to overcome the friction force holding the spacer in place to release the edge of the box from the groove. As The preferred tab includes two segments 54a and 54b, as shown in FIGS. 2A, 3A, 4A and 5A, with one segment on each side 56a and 56b of the body centerline. The segments are spaced a distance ($SD_S$) apart by an opening 58 which aligns with the bore that has a diameter ($D_B$) that is preferably no greater than the distance of the opening. Accordingly, the spacer attaches to the edge of the box in multiple locations to assure a more secure fit but provides adequate clearance for attaching the outlet to the box through the bore.

Although not shown, it will be appreciated that any number of tab sections could be used without departing from the inventive concepts of the spacer described herein. For example, a single tab segment could span the entire edge of the body or three tab segments could be spaced across the proximal edge. Furthermore, the bore could be situated entirely within the protuberance such that the proximal edge is not interrupted by the fastener screw and any number of tabs can therefore be positioned on any portion of the edge.

As shown in FIGS. 2D, 3D, 4D and 5D, the sidewalls of each groove may also include catches 62a and 62b protruding from a top end 70 of each sidewall to more securely attach the spacer to the box. Each catch has a fixed end 64a that connects to the sidewall and a free end 64b positioned within the groove and spaced a catch length ($L_C$) from the fixed end. A catch opening 66 is thereby formed between the opposing catches and has a width ($W_O$) that is smaller than the width of the groove. In operation, the catches can next onto a lip on the perimeter of the box to provide a more secure connection.

Similarly, a grit or other high friction material may cover the interior of the sidewalls and trough of the groove to produce a more secure friction fit. Alternatively, it will be understood that other fastener types may be used in place of the preferred snap fasteners, such as an adhesive, tapes or magnets for use with metal electrical boxes although they are not preferred because magnetic fasteners require a specific box type and adhesives and tapes can lose stickiness, especially in dirty and rough installation conditions. Regardless of the fastener type, the spacer described herein directly attaches to the rough-in box and does not fall off, thereby eliminating the worry about it twisting, turning or not supporting the box.

Figure 7C:
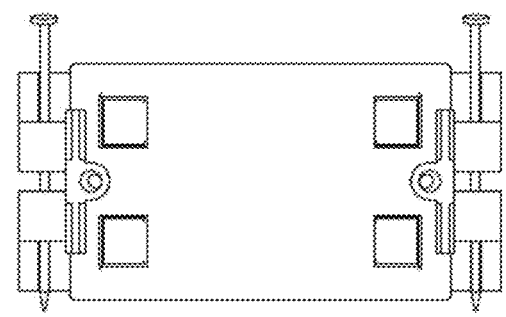
FIGS. 7A-7C illustrate the connection of a spacer to an electrical box according to another embodiment described herein.

Embodiments of the spacer shown in FIGS. 4, 5 and 7 also include depressions 20 on the body surfaces to allow stacking of multiple spacer bodies together. Each depression is proximate to the distal edge and includes mirrored indents 40a and 40b on both surfaces of the body. Each indent includes a recessed face 42 that is recessed an indent depth ($D_I$) from the surface of the body and edges that span the recessed depth. The lateral edge 44a of the indent are longitudinally recessed an indent length ($L_I$) from the distal edge while the longitudinal edge 44b of the indents are laterally recessed an indent width ($W_I$) from one of the pair of side edges. As shown in FIGS. 4D and 5D, the mirrored indents collectively form a reduced thickness ($T_{B'}$) between the corresponding recessed faces that is less than the overall body thickness.

Similar to the preferred two segment tab referenced above, the preferred depression also has two segments on opposite sides of the bore to mate with corresponding grooves in each tab segment. However, it will be appreciated that the depression configuration can vary to match the tab configuration without departing from the inventive aspects of the spacer described herein.

Figure 7B:
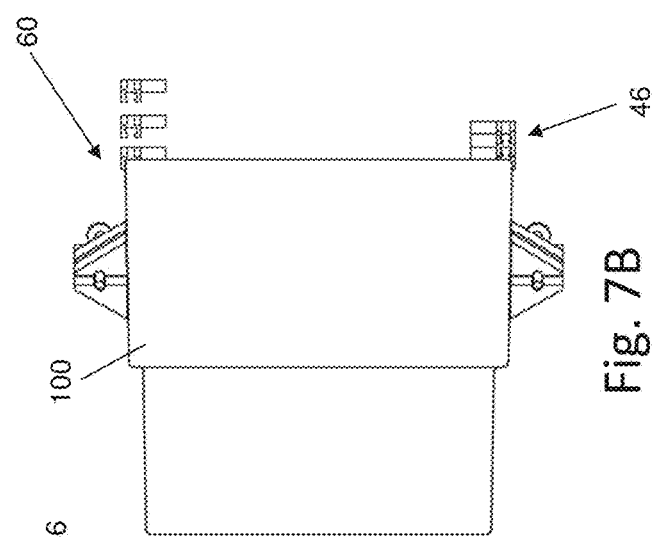
Figure 7A:
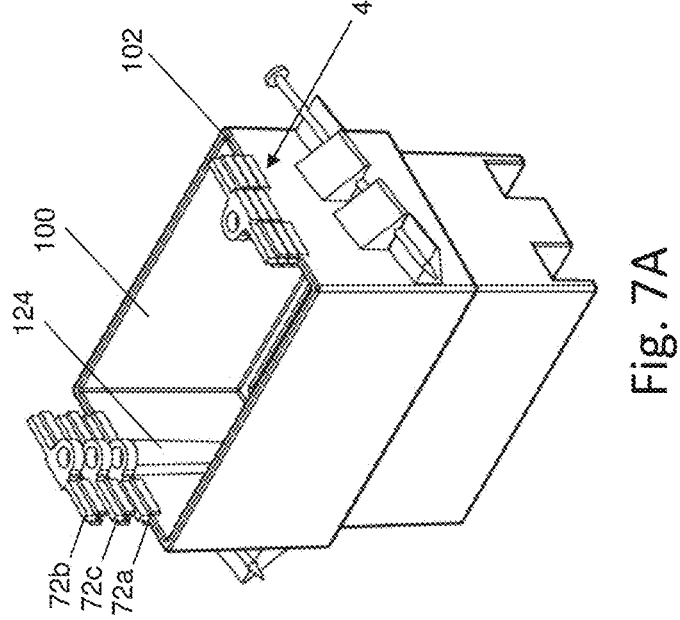

In operation, when a larger spacer is needed the multiple bodies can be stacked together into a stacked configuration 46 by connecting the depressions of one body with the tab and groove fastener of an adjacent body, such as shown in FIGS. 7A and 7B. Once a desired length is reached, the tab and groove of the proximal body 72a can be connected to the perimeter of the box as explained herein and the distal edge of the distal body 72b can abut the outlet spaced from the box by the stacked bodies. Given the bodies are fastened together, each bore is colinear with the bore of adjacent bodies, including middle bodies 72c that may be tween the proximal body attached to the electrical box and the distal body spaced therefrom, such that the screw fastener can extend through the aligned bores to secure the outlet to the box.

Although the specific size and dimensions of the spacer are not intended to be limiting, the spacer also allows the user to identify the proper spacer size without an additional measuring device. As shown in FIG. 9A, the user can first place the distal edge of the spacer against the perimeter of the box and determine whether the chosen spacer will effectively align the outlet intended to be mounted thereto with the corresponding wall based on the relative position of the tab and proximal edge to the wall. In operation, the distal edge is devoid of any protruding tab and therefore flushly abuts the perimeter of the box. Once the distal edge is positioned against the box, the user can check if the proximal edge will be flush with the wall in which the box is mounted to confirm the spacer is the proper size. If the proximal edge is short of the wall plane, the user knows the longitudinal length of the spacer is too short and the outer face of the outlet will still be recessed into the wall if the spacer is used in the installation. If the proximal edge is flush with the wall and only the tabs protrude past the wall as shown in FIG. 9A, the installer knows the spacer is the proper size for the box offset. Further still, if the proximal edge is beyond the wall plane, the user knows the longitudinal length of the spacer is too large and the outer face of the outlet, and perhaps additional portions of the outlet itself, will protrude past the wall if the spacer is used in the installation. Accordingly, the user can confirm they have the proper spacer prior to installing the outlet and swap out the spacer depending on whether they are too long or too short for a particular installation.

As noted above, the relative dimensions of the spacers are not intended to be limiting and may be any number of sizes. Yet, spacers according to the preferred embodiment are generally provided in a set having various dimensions separated by a standard deviation, such as ⅛" or 1/16", to accommodate multiple installations that may have differing recessed depths. To quickly differentiate between the differing sizes, it is preferred that the spacers are color coded. Accordingly, the spacers are self-measuring to support the receptacle or switch and do not require guess work or unnecessary trial-and-error to add or remove layers, such as with the spacers in the prior art.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting.

Thus, the breadth and scope of the present invention should not be limited by any of the above-described exemplary embodiments, but should be defined only in accordance with the following claims appended hereto and their equivalents.

What is claimed is:

1. A spacer for distancing a perimeter of an electrical box from an electrical fixture connected to the electrical box, comprising:
a body comprising a proximal edge, a distal edge, a pair of opposing side edges, a first surface, a second surface, a body length between the proximal edge and the distal edge, a body width between the pair of opposing side edges and a body thickness between the first surface and the second surface;
a bore longitudinally extending through the body between the proximal edge and the distal edge, wherein the bore comprises a first opening within the proximal edge of the body and a second opening within the distal edge of the body, and wherein a fastener is configured to extend through the electrical fixture, the bore and into the electrical box;
a tab protruding from the proximal edge of the body, wherein the tab comprises a fixed end, a free end, a pair of opposing side ends, a tab length between the fixed end and the free end, and a tab width between the pair of opposing side ends, wherein the fixed end is connected to the proximal edge of the body, and wherein the free end is spaced the tab length from the free end; and
a groove laterally extending a groove length within the tab between the pair of opposing side ends, wherein the groove comprises a trough between a pair of sidewalls, wherein the pair of sidewalls are spaced by a groove width, wherein the trough is recessed from the fixed end of the tab by a groove depth, wherein the groove length is equal to the tab width, and wherein the perimeter of the electrical box is releasably received within the groove.

2. The spacer of claim 1 further comprising a depression within the body proximate to the distal edge, wherein the depression comprises a first indent and a second indent respectively positioned on the first surface and the second surface, wherein each of the first indent and the second indent comprise a recessed face, a lateral edge and a longitudinal edge, wherein the recessed faces are recessed an indent depth from the respective first surface and second surface, wherein the lateral edges are recessed an indent length from the distal edge, wherein the longitudinal edges are recessed an indent width from one of the pair of opposing side edges, and wherein the lateral edges and the longitudinal edges span the indent depth.

3. The spacer of claim 2, wherein the depression further comprises a reduced thickness between the respective recessed faces of the first indent and the second indent, and wherein the reduced thickness is less than the body thickness.

4. The spacer of claim 2, further comprising another body separated from the body, wherein the other body comprises another bore, another tab, another groove, and another depression, wherein the depression of the body is releasably received within the other groove of the other body in a stacked configuration, wherein the proximal edge of the body abuts the distal edge of the other body in the stacked configuration, and wherein the bore of the body is colinearly aligned with the other bore of the other body in the stacked configuration.

5. The spacer of claim 1, wherein the body further comprises a protuberance protruding a distance from the first surface, wherein the protuberance longitudinally extends a protuberance length between a first end and a second end, wherein the first end is coplanar with the proximal edge of the body, wherein the second end is coplanar with the distal edge of the body, and wherein at least a portion of the bore is situated within the protuberance.

6. The spacer of claim 1, wherein the body comprises a longitudinal centerline equidistant between the pair of opposing side edges, wherein the tab comprises a first segment positioned on a first side of the longitudinal centerline, a second segment positioned on a second side of the longitudinal centerline and an opening between the first segment and the second segment, wherein the opening spaces the first segment and the second segment by a distance, wherein the bore further comprises a diameter that is less than the distance, and wherein the bore intersects with the opening between the first segment and the second segment.

7. The spacer of claim 1, wherein the pair of sidewalls bias outwardly to receive the perimeter of the electrical box, and wherein the groove holds the perimeter of the electrical box with a friction fit.

8. The spacer of claim 1 further comprising a pair of catches respectively protruding into the groove from the pair of sidewalls, wherein each catch comprises a fixed catch end attached to one of the pair of sidewalls and a free catch end spaced a catch length from the fixed catch end within the groove, wherein the groove further comprises a catch opening between the respective free catch ends within the groove, and wherein the catch opening is less than the groove width.

9. The spacer of claim 8, wherein the pair of catches catch onto a lip on the perimeter of the electrical box.

10. The spacer of claim 1, wherein the body thickness is no less than a perimeter thickness of the perimeter of the electrical box, and wherein the lateral width is greater than the body thickness.

11. A spacer for distancing a perimeter of an electrical box from an electrical fixture connected to the electrical box, comprising:
a body comprising a proximal edge, a distal edge, a pair of opposing side edges, a first surface, a second surface, a body length between the proximal edge and the distal edge, a body width between the pair of opposing side edges, a body thickness between the first surface and the second surface, and a longitudinal centerline equidistant between the pair of opposing side edges;
a bore longitudinally extending through the body between the proximal edge and the distal edge, wherein the bore comprises a first opening within the proximal edge of the body, and a second opening within the distal edge of the body, and wherein a fastener is configured to extend through the electrical fixture, the bore and into the electrical box;
a pair of tabs respectively protruding from the proximal edge of the body, wherein the tabs are positioned on opposite sides of the longitudinal centerline and laterally spaced a distance by an opening, wherein each tab comprises a fixed end, a free end, a pair of opposing side ends, a tab length between the fixed end and the free end, and a tab width between the pair of opposing side ends, wherein the fixed end is connected to the proximal edge of the body, and wherein the free end is spaced the tab length from the free end; and
a groove laterally extending a groove length within each tab between the respective pair of opposing side ends, wherein the groove comprises a trough between a pair of sidewalls, wherein the pair of sidewalls are spaced by a groove width, wherein the trough is recessed from the fixed end of the tab by a groove depth, and wherein the groove length is equal to the tab width, and wherein the perimeter of the electrical box is releasably received within the groove of each tab.

12. The spacer of claim 10, further comprising a pair of depressions within the body proximate to the distal edge, wherein the depressions are positioned on opposite sides of the longitudinal centerline and laterally spaced another distance by the bore, wherein each depression comprises a first indent and a second indent respectively positioned on the first surface and the second surface, wherein each of the first indent and the second indent comprise a recessed face, a lateral edge and a longitudinal edge, wherein the recessed faces are recessed an indent depth from the respective first surface and second surface, wherein the lateral edges are recessed an indent length from the distal edge, wherein the longitudinal edges are recessed an indent width from one of the pair of opposing side edges, and wherein the lateral edges and the longitudinal edges span the indent depth.

13. The spacer of claim 12, further comprising another body separated from the body, wherein the other body comprises another bore, another tab, another groove, and another depression, wherein the depression of the body is releasably received within the other groove of the other body in a stacked configuration, wherein the proximal edge of the body abuts the distal edge of the other body in the stacked configuration, and wherein the bore of the body is colinearly aligned with the other bore of the other body in the stacked configuration.

14. The spacer of claim 11 further comprising a pair of catches respectively protruding into each of the grooves from the respective pair of sidewalls, wherein each catch comprises a fixed catch end attached to one of the pair of sidewalls and a free catch end spaced a catch length from the fixed catch end within the groove, wherein the groove further comprises a catch opening between the respective free catch ends within the groove, and wherein the catch opening is less than the groove width.

15. The spacer of claim 11, wherein the body further comprises a protuberance protruding a distance from the first surface, wherein the protuberance longitudinally extends a protuberance length between a first end and a second end, wherein the first end is coplanar with the proximal edge of the body, wherein the second end is coplanar with the distal edge of the body, wherein at least a portion of the bore is situated within the protuberance, wherein the protuberance comprises a protuberance width that is less than the distance between the pair of tabs, and wherein the bore comprises a diameter that is less than the protuberance width.

16. The spacer of claim 11, wherein the pair of sidewalls bias outwardly to receive one of the perimeter of the electrical box, and wherein the groove holds the perimeter of the electrical box with a friction fit.

17. A spacer for distancing a perimeter of an electrical box from an electrical fixture connected to the electrical box, comprising:

a plurality of separate bodies each comprising a proximal edge, a distal edge, a pair of opposing side edges, a first surface, a second surface, a body length between the proximal edge and the distal edge, a body width between the pair of opposing side edges, a body thickness between the first surface and the second surface, and a longitudinal centerline equidistant between the pair of opposing side edges;

a bore longitudinally extending through each body between the proximal edge and the distal edge, wherein the bore comprises a first opening within the proximal edge of the body, and a second opening within the distal edge of the body, and wherein a fastener is configured to extend through the electrical fixture, the bore and into the electrical box;

a pair of tabs respectively protruding from the proximal edge of each body, wherein the tabs are positioned on opposite sides of the longitudinal centerline and laterally spaced a distance by an opening, wherein each tab comprises a fixed end, a free end, a pair of opposing side ends, a tab length between the fixed end and the free end, and a tab width between the pair of opposing side ends, wherein the fixed end is connected to the proximal edge of the body, and wherein the free end is spaced the tab length from the free end;

a groove laterally extending a groove length within each tab between the respective pair of opposing side ends of each body, wherein the groove comprises a trough between a pair of sidewalls, wherein the pair of sidewalls are spaced by a groove width, wherein the trough is recessed from the fixed end of the tab by a groove depth, and wherein the groove length is equal to the tab width; and a pair of depressions within each body proximate to the distal edge, wherein the depressions are positioned on opposite sides of the longitudinal centerline and laterally spaced another distance by the bore, wherein each depression comprises a first indent and a second indent respectively positioned on the first surface and the second surface, wherein each of the first indent and the second indent comprise a recessed face, a lateral edge and a longitudinal edge, wherein the recessed faces are recessed an indent depth from the respective first surface and second surface, wherein the lateral edges are recessed an indent length from the proximal edge, wherein the longitudinal edges are recessed an indent width from one of the pair of opposing side edges, and wherein the lateral edges and the longitudinal edges span the indent depth, wherein the depressions of a distal body from the plurality of bodies are releasably received within the grooves of a proximal body from the plurality of bodies in a stacked configuration, wherein the proximal edge of the distal body abuts the distal edge of the proximal body in the stacked configuration, wherein the bore of the proximal body is colinearly aligned with the bore of the distal body in the stacked configuration, and wherein the perimeter of the electrical box is releasably received within the groove of each tab of the proximal body.

18. The set of spacers of claim 17, wherein the body further comprises a protuberance protruding a distance the first surface, wherein the protuberance longitudinally extends a protuberance length between a first end and a second end, wherein the first end is coplanar with the proximal edge of the body, wherein the second end is coplanar with the distal edge of the body, wherein at least a portion of the bore is situated within the protuberance, wherein the protuberance comprises a protuberance width that is less than the distance between the pair of tabs, and wherein the bore comprises a diameter that is less than the protuberance width.

19. The set of spacers of claim 17, wherein the pair of sidewalls of the proximal body bias outwardly to receive the perimeter of the electrical box, wherein the pair of sidewalls of the distal body bias outwardly to receive the depressions of the proximal body, and wherein the groove of the proximal body and the distal body hold the respective perimeter of the electrical box and the depression of the proximal body with a friction fit.

20. The set of spacers of claim 17, wherein the body thickness is no less than a perimeter thickness of the perimeter of the electrical box.

\* \* \* \* \*